US008279492B2

(12) United States Patent
Mizuno (10) Patent No.: US 8,279,492 B2
(45) Date of Patent: Oct. 2, 2012

(54) IMAGE PROCESSING DEVICES AND COMPUTER PROGRAM PRODUCTS FOR PROCESSING IMAGE DATA

(75) Inventor: Toru Mizuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 695 days.

(21) Appl. No.: 12/411,343

(22) Filed: Mar. 25, 2009

(65) Prior Publication Data

US 2009/0244635 A1 Oct. 1, 2009

(30) Foreign Application Priority Data

Mar. 28, 2008 (JP) ................................. 2008-088613

(51) Int. Cl.
*G06T 5/00* (2006.01)

(52) U.S. Cl. ......... 358/3.26; 358/1.9; 358/2.1; 382/118; 382/167

(58) Field of Classification Search ................. 358/3.26, 358/1.9, 2.1; 382/118, 167
See application file for complete search history.

(56) References Cited

U.S. PATENT DOCUMENTS

| | | | |
|---|---|---|---|
| 6,711,291 B1 | 3/2004 | Stubler et al. | |
| 6,940,545 B1 | 9/2005 | Ray et al. | |
| 6,993,719 B1 | 1/2006 | Edwards et al. | |
| 2004/0090653 A1 | 5/2004 | Grimsey | |
| 2004/0109150 A1 | 6/2004 | Igarashi | |
| 2005/0196040 A1* | 9/2005 | Ohara | 382/167 |
| 2006/0120599 A1 | 6/2006 | Steinberg et al. | |
| 2007/0115363 A1 | 5/2007 | Nakamura | |
| 2007/0212144 A1* | 9/2007 | Matsuzaka et al. | 400/62 |
| 2007/0222884 A1* | 9/2007 | Mori et al. | 348/333.05 |
| 2008/0062268 A1 | 3/2008 | Ohara et al. | |
| 2009/0110245 A1* | 4/2009 | Thorn | 382/118 |

FOREIGN PATENT DOCUMENTS

| | | |
|---|---|---|
| EP | 1418746 A2 | 5/2004 |
| JP | 2000-218907 A | 8/2000 |
| JP | 2001-333372 A | 11/2001 |
| JP | 2004-157540 A | 6/2004 |
| JP | 2005-141584 A | 6/2005 |
| JP | 2005-159850 A | 6/2005 |

(Continued)

OTHER PUBLICATIONS

European Patent Office; European Search Report in Application No. 09250855.5 mailed Aug. 17, 2009.

(Continued)

*Primary Examiner* — Twyler Haskins
*Assistant Examiner* — Michael Burleson
(74) *Attorney, Agent, or Firm* — Baker Botts L.L.P.

(57) ABSTRACT

An image processing device includes an image quality determining unit that determines whether data of an original image meets a particular criterion of a particular image quality category, a thumbnail list image data generating unit that generates image data of a thumbnail list, and a mark adding unit that adds particular indicator mark image data to the thumbnail list image data when it is determined that the original image data does not meet the particular criterion. The particular indicator mark image data corresponds to a particular indicator mark positioned in the thumbnail list at a position corresponding to the thumbnail of the original image. The particular indicator mark indicates a result of the determination made by the image quality determining unit. An output unit outputs the thumbnail list based on the thumbnail list image data.

12 Claims, 8 Drawing Sheets

FOREIGN PATENT DOCUMENTS

| | | |
|---|---|---|
| JP | 2006-178348 A | 7/2006 |
| JP | 2006-190154 A | 7/2006 |
| JP | 2007-088552 A | 4/2007 |
| JP | 2007-166187 A | 6/2007 |

OTHER PUBLICATIONS

Japan Patent Office, Notice of Reasons for Rejection for Japanese Patent Application No. 2008-088613, mailed May 18, 2010.

* cited by examiner

| No. | GENERAL | RED EYE | CUT-OFF | MARK POSITION |
|---|---|---|---|---|
| 1 | 0 | 1 | 0 | 0 |
| 2 | 0 | 0 | 0 | 0 |
| 3 | 0 | 2 | 0 | 0 |
| 4 | 0 | 0 | 0 | 0 |
| 5 | 2 | 0 | 0 | 1 |
| 6 | 1 | 0 | 1 | 0 |
| ⋮ | ⋮ | ⋮ | ⋮ | ⋮ |

Fig.3B

|   | GENERAL | RED EYE | CUT-OFF |
|---|---|---|---|
| 0 | — (GOOD) | — (GOOD) | — (GOOD) |
| 1 | ZC | RC | O |
| 2 | ZF | RF | — |

IMAGE PROCESSING DEVICES AND COMPUTER PROGRAM PRODUCTS FOR PROCESSING IMAGE DATA

CROSS-REFERENCE TO RELATED APPLICATION

The present application claims priority from Japanese Patent Application Publication No. JP-2008-088613, which was filed on Mar. 28, 2008, the disclosure of which is incorporated herein by reference in its entirety.

BACKGROUND OF THE INVENTION

1. Field of the Invention

The present invention relates to image processing devices.

2. Description of Related Art

A known image processing device of the related art reads data of images photographed with a digital camera from a memory card, and outputs a list of thumbnails based on the read image data by, for example, displaying or printing. Thumbnails are reduced-size images of corresponding original images. An image processing device disclosed in JP-A-2001-333372 is configured to display a list of thumbnails while adding a correction mark, which indicates details of correction made to an original image, to below the corresponding thumbnail.

In a known image output device, e.g., the image output device disclosed in JP-2001-333372, a quality of the corrected original image may be difficult to determine from a thumbnail with a correction mark, although the correction details can be known from the correction mark. That is, even if the corrected original image has an improved quality, a user cannot evaluate whether image quality of the corrected original image is good and thus still has a difficulty in selecting images of good quality from the thumbnail list. In addition, since the thumbnails are reduced-size images of original images, a user has a difficulty in determining image quality from the thumbnails.

SUMMARY OF THE INVENTION

Therefore, an object of the invention is to provide an image processing device which overcomes these and other shortcomings of the related art. A technical advantage of the invention is that a list of thumbnails output by an image processing unit allows a user to easily select original images of good quality.

According to an embodiment of the invention, an image processing device comprises an image quality determining unit configured to determine whether data of an original image meets a particular criterion of a particular image quality category, a thumbnail list image data generating unit configured to generate image data of a thumbnail list, wherein the image data of the thumbnail list comprises a thumbnail of the original image, a mark adding unit configured to add particular indicator mark image data to the thumbnail list image data when the image quality determining unit determines that the original image data does not meet the particular criterion, wherein the particular indicator mark image data corresponds to a particular indicator mark positioned in the thumbnail list at a position corresponding to the thumbnail of the original image, and the particular indicator mark indicates at least a result of the determination made by the image quality determining unit, and an output unit configured to output the thumbnail list based on the image data of the thumbnail list.

According to another embodiment of the invention, a computer program product comprising a computer usable medium having computer readable instructions stored thereon, the computer readable instructions configured to cause a processor to execute the steps of determining whether data of an original image meets a particular criterion of a particular image quality category, generating image data of a thumbnail list, wherein the image data of the thumbnail list comprises image data of a thumbnail of the original image, adding particular indicator mark image data to the thumbnail list image data when the original image data does not meet the particular criterion, wherein the particular indicator mark image data corresponds to a particular indicator mark positioned in the thumbnail list at a position corresponding to the thumbnail of the original image, and the particular indicator mark indicates at least a result of the determination of whether the original image data meets the particular criterion of the particular image quality category, and outputting the thumbnail list based on the image data of the thumbnail list.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

DETAILED DESCRIPTION OF THE EMBODIMENTS

Embodiments of the invention and their features and technical advantages may be understood by referring to FIGS. 1-8B, like numerals being used for like corresponding parts in the various drawings.

Figure 1:
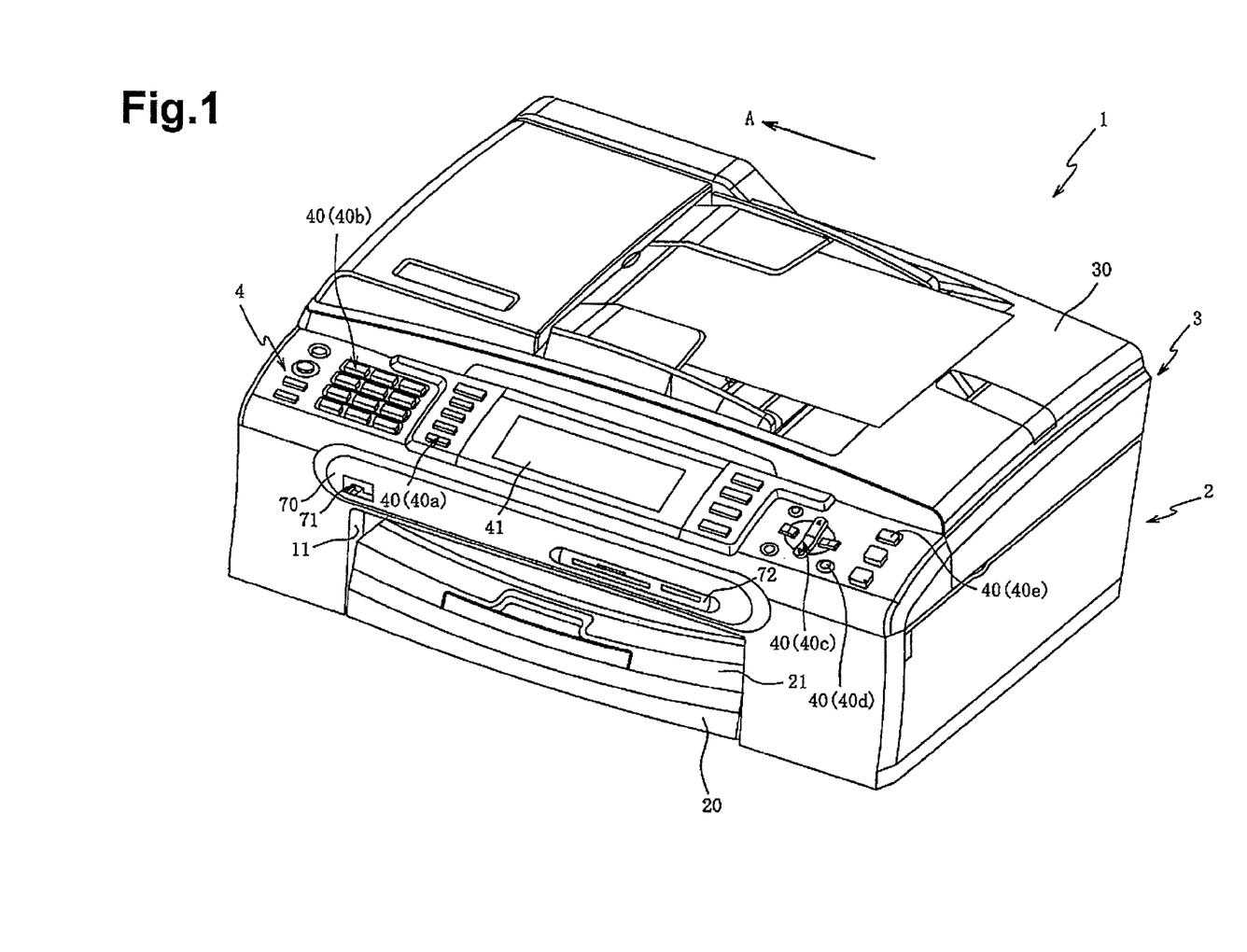
FIG. 1 is a perspective view showing the appearance of a configuration of a multi-function device, according to an embodiment of the invention.

An image processing device, e.g., a multi-function device 1, includes a printer 2 positioned in a lower portion thereof, a scanner 3 positioned in an upper portion thereof, and an operation panel 4 positioned in a front portion of the scanner 3. The multi-function device 1 combines functions of a scanner, copier, facsimile and printer.

In addition, the multi-function device 1 may also be connected to external devices, such as a USB memory, a digital camera, and a personal computer, so as to record data received from the external devices on a sheet or display the received data in a liquid crystal display 41, hereinafter interchangeably referred to as "LCD" 41, on the operation panel 4.

The printer 2 includes an opening 11 in a front portion thereof. A feed tray 20 and an output tray 21 are positioned in a vertically stacked manner and are partially exposed through the opening 11. The sheets placed on the feed tray 20 are fed into the printer 2 and then discharged to the output tray 21 with images recorded thereon.

The scanner 3 herein is a flatbed scanner. A document cover 30 is positioned as a top panel of the multi-function device 1. A platen glass is positioned below the document cover 30. An original document is placed on the platen glass and read by the scanner 3 with the document cover 30 positioned thereon. A user operates the printer 2 and the scanner 3 on the operation panel 4 which includes the LCD 41 and various operation keys 40, e.g., a function key 40a, a numeric keypad 40b, a direction key 40c, an enter key 40d, and a user ID key 40e.

Execution instructions for the scanner, the copier, the facsimile and the printer are input with the function key 40a. Data including the number of sheets to be copied and a fax number is input with the numeric keypad 40b. A cursor location displayed on the LCD 41 is input with the direction key 40c. Execution instructions for various operations are input with enter key 40d. Execution instructions for user ID verification to authorize the user of the multi-function device 1 are input with the user ID key 40e.

Figure 2:
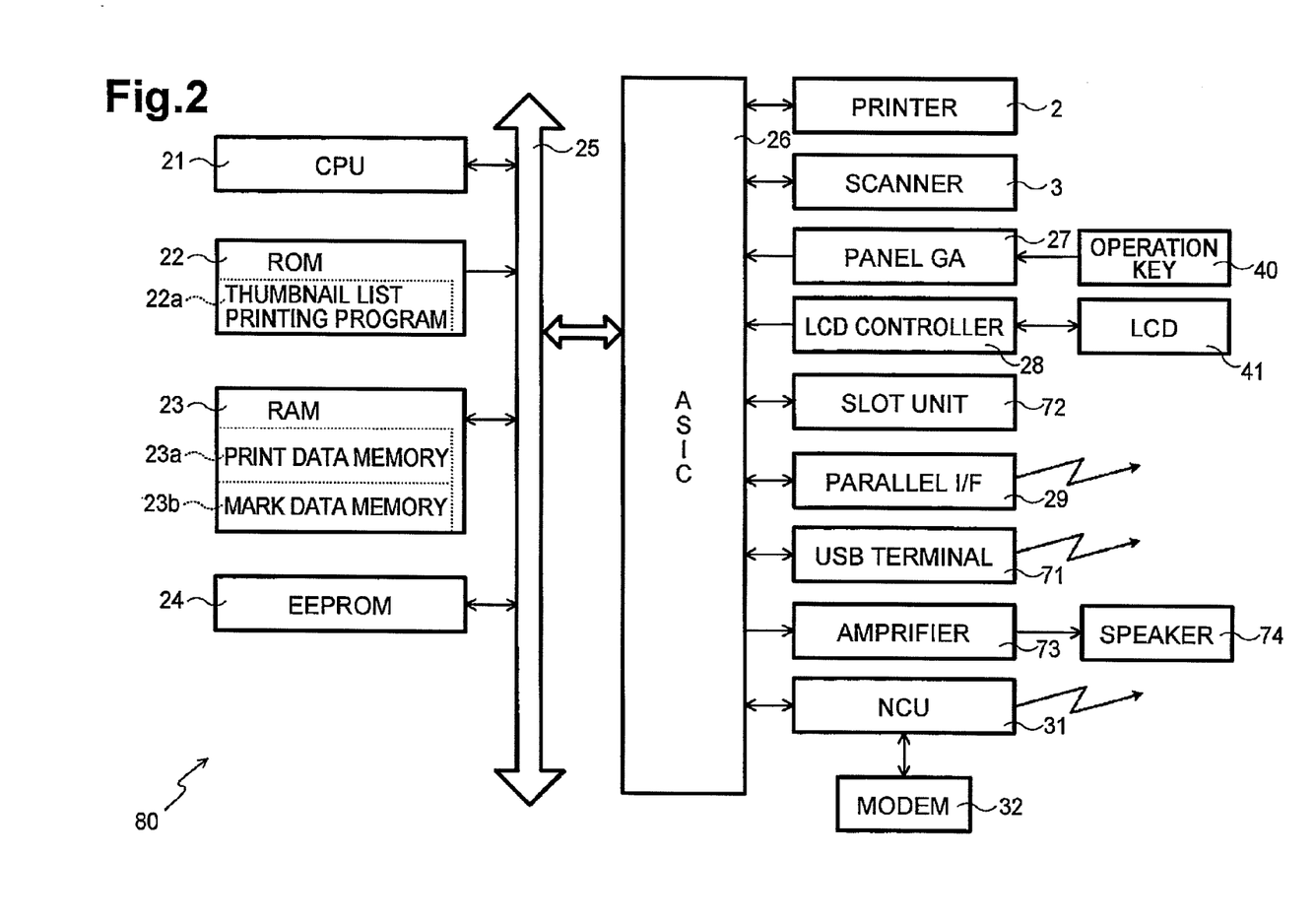
FIG. 2 is s block diagram showing a schematic configuration of a controller of the multi-function device, according to an embodiment of the invention.

When a predetermined instruction is input to the multi-function device 1 via these operation keys 40, a controller 80, e.g., as shown in FIG. 2, controls operation of the multi-function device 1 in accordance with the instruction. The multi-function device 1 also may operate in accordance with instructions provided by a computer, e.g., via a printer driver or a scanner driver.

The LCD 41 illustrated in FIG. 1 is not to scale. Nevertheless, as shown in FIG. 1, the LCD 41 may have a substantially rectangular configuration, e.g., with an aspect ratio of 3:8, with the direction of arrow A being a transverse direction. In particular, two rectangular LCDs, each having an aspect ratio of 3:4, may be positioned adjacent to each other in the direction of arrow A. A touch panel is formed integrally with the LCD 41. When the user selects a button displayed on the LCD 41, an instruction assigned to the selected button may be input.

A connection panel 70 may be positioned below the operation panel 4 and above the opening 11. An USB terminal 71 may be positioned at the leftmost end of the connection panel 70. The USB terminal 71 is a connector terminal for communicatively connecting an external device and the multi-function device 1 via an USB connection.

A slot unit 72 may be positioned at the rightmost end of the connection panel 70. The slot unit 72 may comprise several card slots in which memory cards may be placed. The controller 80, which is described in more detail herein, reads image data from a memory card placed in the card slot. The image data read from by controller 80 may be displayed on the LCD 41, or may be recorded on a sheet.

FIG. 2 describes a schematic configuration, e.g., a block diagram, of the controller 80 which controls the operation of the multi-function device 1 according to an embodiment of the invention. The controller 80 collectively controls the operation of the multi-function device 1, including the printer 2, the scanner 3, and the operation panel 4.

The controller 80 may be a microcomputer comprising a central processing unit ("CPU") 21, a read only memory ("ROM") 22, a random access memory ("RAM") 23 and an electrically erasable and programmable ROM ("EEPROM") 24. The controller 80 is connected to an application specific integrated circuit ("ASIC") 26 via, e.g., a bus 25.

The CPU 21 may be a central processing unit which collectively controls the multi-function device 1 and operates in accordance with a program stored in the ROM 22. The ROM 22 may store programs for controlling the operations of the multi-function device 1. A program for printing the thumbnail list 22a may be stored in the ROM 22 as a program for executing a process shown in the flowchart of FIG. 4.

In the process of printing a thumbnail list, a list of reduced-size images, hereinafter interchangeably referred to as "thumbnails," of corresponding original image data stored in the memory card may be printed on a sheet by the printer 2. In the process according to an embodiment of the invention, the printer 2 may print a thumbnail list that allows a user to easily select original images of good quality.

The RAM 23 may be used as a storage area or a work area for temporarily storing various data used by the CPU 21 for executing the above-described program. Print data memory 23a and mark data memory 23b may be assigned to the RAM 23.

The print data to be printed on a sheet by the printer 2 may be stored in the print data memory 23a. Information on marks to be added to the thumbnails may be stored in the mark data memory 23b. A mark adding table, e.g., the mark adding table shown in FIG. 3A, may be stored in the mark data memory 23b.

Figure 3A:
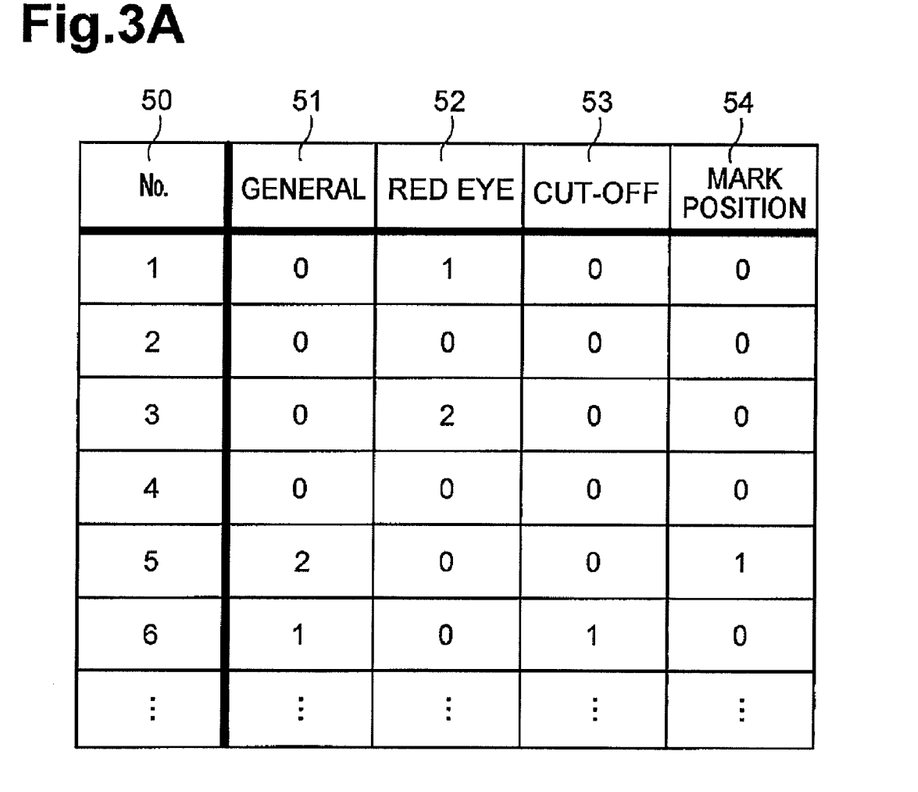
FIG. 3A shows a mark adding table, according to an embodiment of the invention.

As shown in FIG. 3A, a "NO." column 50, a "GENERAL" column 51, a "RED EYE" column 52, a "CUT-OFF" column 53, and a "MARK POSITION" column 54 may be positioned in the mark adding table, in this order starting from the left side of the table. Numbers for identifying original images are stored in the "NO." column 50. Although consecutive numbers may be used for ease of explanation in an embodiment, other information associated with each original image, e.g., filename information, photographed date and time information, file format, and the like, also may be stored in the "NO." column 50.

The "GENERAL" column 51 may store information regarding general image quality, e.g., quality relating to defocus, camera shake, and the like, for a particular image. In particular, in an embodiment of the invention, 0 is stored for an image of good quality, 1 is stored for an image of good quality after correction, and 2 is stored for an image of poor quality even after correction. In the embodiment shown in FIG. 3A, the images of Nos. 1 to 4 for which 0 is stored are of good quality, the image of No. 6 for which 1 is stored is of good quality after correction, and the image of No. 5 for which 2 is stored is of poor quality.

The "RED EYE" column 52 may store information as to whether or not a red-eye phenomenon is present in an original image that includes human pupils. In an embodiment of the invention, 0 is stored if no red-eye phenomenon is present or no human pupil is included in an image, 1 is stored if a red-eye phenomenon is absent after correction, and 2 is stored if a red-eye phenomenon is still present after correction. In the embodiment shown in FIG. 3A, no red-eye phenomenon is present, or no human pupil is included in the images of Nos. 2, 4, 5, and 6 for which 0 is stored. Moreover, the red-eye phenomenon is absent after correction in the image of No. 1 for which 1 is stored, and a red-eye phenomenon is still present after correction in the image of No. 3 for which 2 is stored.

The "CUT-OFF" column 53 may store information as to whether or not a human face is cut off by a frame of an original image. In an embodiment of the invention, 0 is stored if a human face is not cut off by an image frame or no human face is included in an image, and 1 is stored if a human face is cut off by an image frame. In the embodiment shown in FIG. 3A, a human face is not cut off by an image frame or no human face is included in the images of Nos. 1 to 5 for which 0 is stored, and a human face is cut off by an image frame in the image of No. 6 for which 1 is stored.

The "MARK POSITION" column 54 stores information on positions of marks to be added to thumbnails. The marks indicate information stored in the "GENERAL" column 51, the "RED EYE" column 52, and the "CUT-OFF" column 53. One or more marks may be added at a top right corner or a top left corner of each applicable thumbnail. In an embodiment of the invention, 0 is stored if the mark is added at the top left corner of a thumbnail and 1 is stored if the mark is added at the top right corner of a thumbnail. In the embodiment shown in FIG. 3A, the mark is added at the top left corner of the thumbnail of each image of Nos. 1 to 4 and 6 for which 0 is stored, and the mark is added at the top right corner of the thumbnail of the image of No. 5 for which 1 is stored.

Figure 3B:
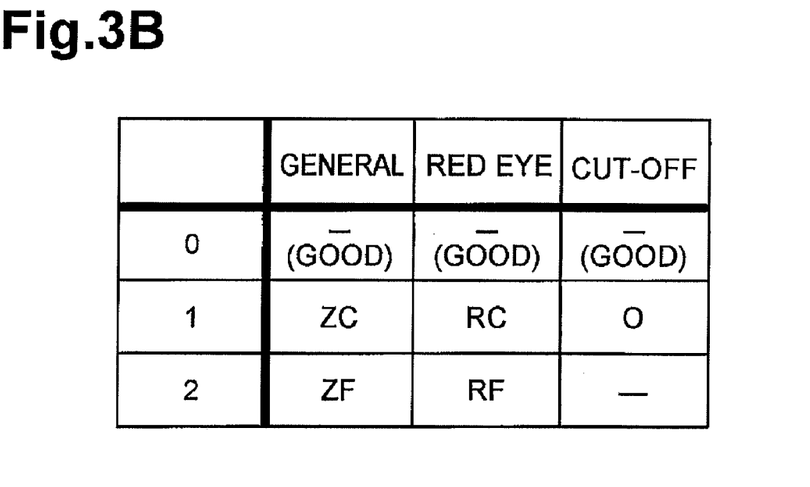
FIG. 3B shows a table of marks to be added, according to an embodiment of the invention.

FIG. 3B illustrates the marks to be added to the thumbnails according to an embodiment of the invention. In an embodiment of the invention, regarding the general image quality, no mark is added to the thumbnail of an image of good quality, a "ZC" mark is added to the thumbnail of an image of good quality after correction, and a "ZF" mark is added to the thumbnail of an image of poor quality after correction. In an embodiment of the invention, regarding the red-eye phenomenon, no mark is added to the thumbnail if no red-eye phenomenon is present or no human pupil is included in an image, an "RC" mark is added to the thumbnail if a red-eye phenomenon is absent in an image after correction, and an "RF" mark is added to the thumbnail if a red-eye phenomenon is still present in an image after correction. In an embodiment of the invention, regarding cut-off of a human face by a frame of an image, no mark is added to the thumbnail if a human face is not cut off by an image frame or no human face is included in an image, and an "O" mark is added to the thumbnail if a human face is cut off by an image frame.

In other words, in an embodiment of the invention, the "ZC" mark indicates that the general image quality is good after correction, the "ZF" mark indicates that the general image quality is still poor after correction, the "RC" mark indicates that the red-eye phenomenon is absent after correction, the "RF" indicates that the red-eye phenomenon is still present after correction, and the mark "O" indicates that a human face is cut off by an image frame.

These marks may be added to applicable thumbnails in a printed thumbnail list. Thus, a user may evaluate quality of the original images by checking the marks added to the reduced-size thumbnails of the original images. Specifically, the user may confirm, with reference to the marks, the general image quality, presence of the red-eye phenomenon, and presence of a human face cut off by an image frame. In this manner, an output thumbnail list allows a user to easily and quickly select original images of good quality.

The ASIC 26 may control operation of the printer 2, the scanner 3, the operation panel 4, and the slot unit 72 in accordance with instructions from the CPU 21. The printer 2, the scanner 3, a panel gate array ("panel GA") 27, a LCD controller 28, the slot unit 72, a parallel interface ("parallel I/F") 29, a USB terminal 71, and an amplifier 73 may be connected to the ASIC 26. The panel gate array 27 may control the printer 2, the scanner 3, and the operation key 40. The LCD controller 28 controls a screen display of the LCD 41. The parallel interface 29 transmits and receives data to and from a computer via a parallel cable or an USB cable. The amplifier 73 amplifies sound output from a speaker 74. A network control unit ("NCU") 31 also may be connected to the ASIC 26. A modem 32 is connected to the NCU 31. The multi-function device 1 may transmit and receive facsimiles via the NCU 31 and the modem 32.

Figure 4:
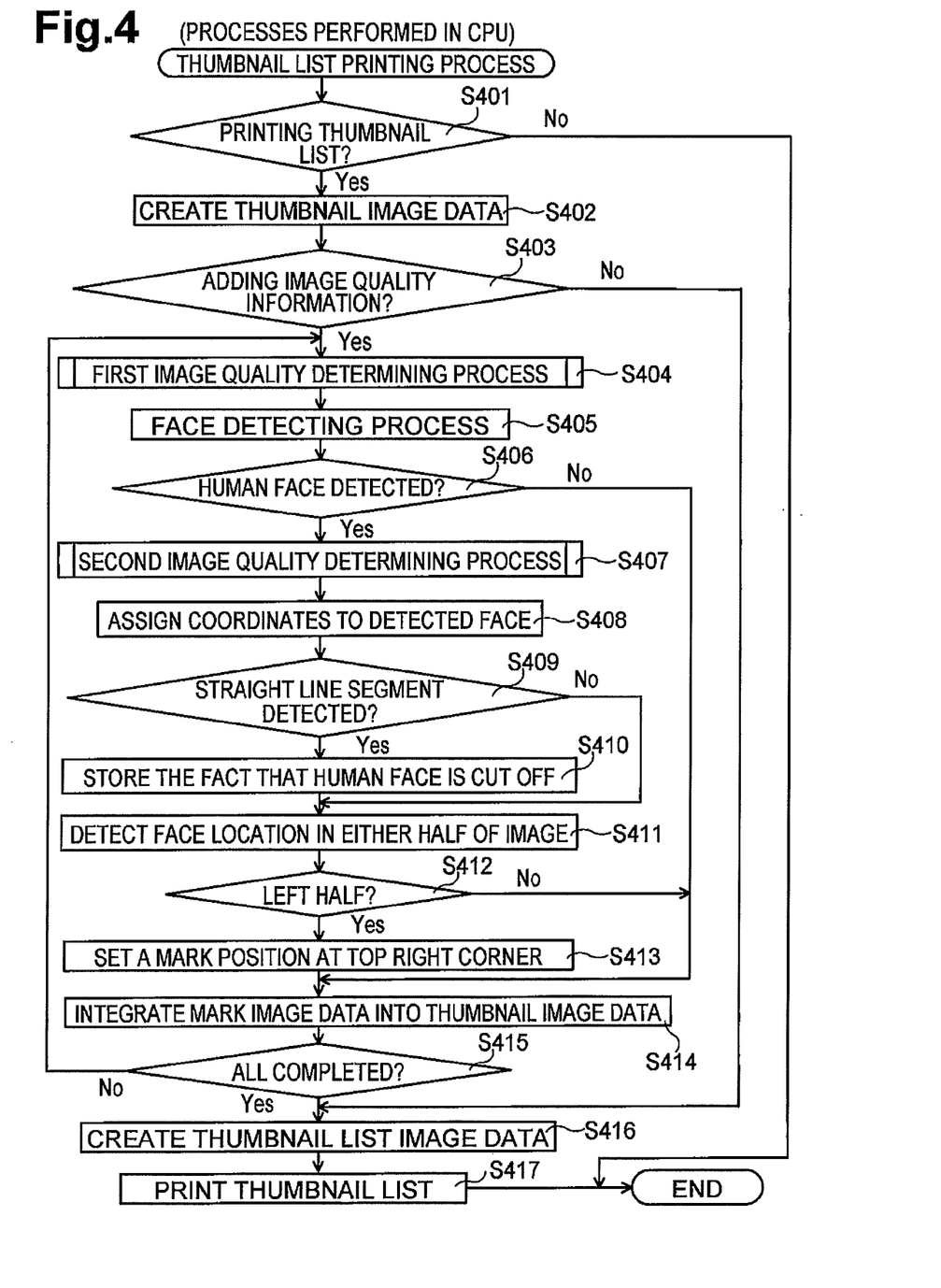
FIG. 4 is a flowchart illustrating a printing process of a thumbnail list, according to an embodiment of the invention.

FIG. 4 shows a flowchart describing a process of printing a thumbnail list according to an embodiment of the invention. The process shown in FIG. 4 is for outputting a thumbnail list based on thumbnail list image data. The outputted thumbnail list may allow a user to easily select original images of good quality. This process may be carried out when a predetermined operation key 40 is pressed to input an execution command, while a memory card is placed in the slot unit 72.

First, at Step S401, it is determined whether or not an execution command for printing a thumbnail list is input. If this step is affirmative, e.g. "YES" at Step S401, then at Step S402, original image data stored in the memory card may be read, and image data of thumbnails corresponding to the read original image data may be created. When the execution command for printing the thumbnail list is inputted, a mark adding table may be initialized. In an embodiment of the invention, initializing the mark adding table may correspond to storing a value of "0" in all columns. If the result of Step S401 is negative, e.g. "NO" at Step S401, then the processing is completed.

Next, at Step S403, the system determines whether or not an instruction to add marks indicating image quality to the thumbnails is inputted. If the result of Step S403 is negative, e.g. "NO" at Step S403, then processing moves to Step S416, at which a thumbnail list image data may be created based on the thumbnail image data created at Step S402. After a thumbnail list is printed at Step S417 based on the thumbnail list image data created at Step S406, then the processing is completed.

If the result of Step S403 is affirmative, e.g. "YES" at Step S403, then processing carries out steps S404-S415 for each piece of original image data that is associated with a corresponding piece of thumbnail image data created at Step S402. At Step S404, a first image quality determining process is carried out, which will be described in more detail herein with reference to the flowchart shown in FIG. 5.

Figure 5:
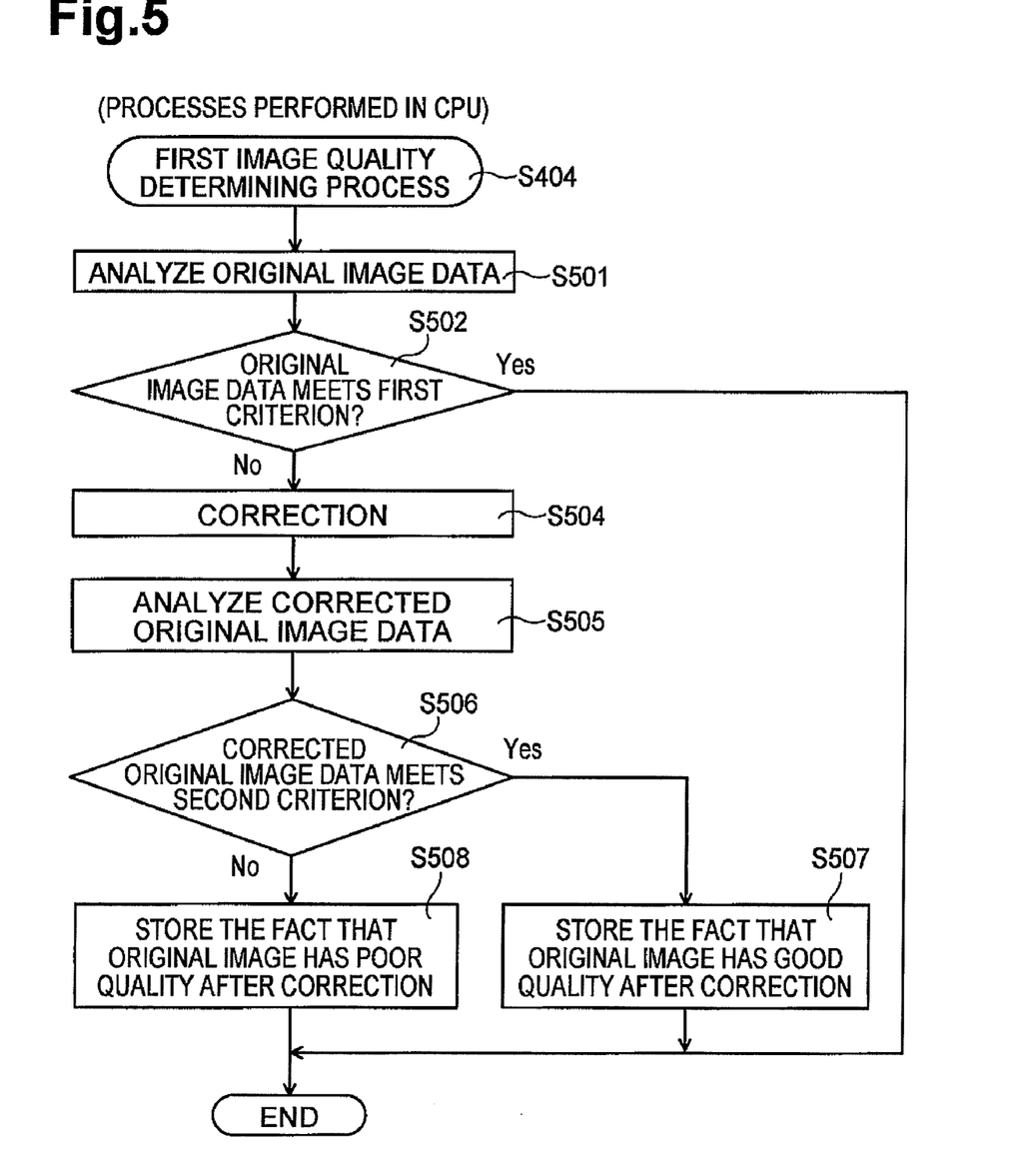
FIG. 5 is a flowchart illustrating a first image quality determining process, according to an embodiment of the invention.

FIG. 5 shows a flowchart illustrating the first image quality determining process according to an embodiment of the invention. In this process, it is determined, by analyzing original image data, whether a general image quality of an original image meets a predetermined criterion. In an embodiment of the invention, the general image quality may relate, e.g., to defocus and camera shake.

First, at Step S501, image data of a target original image is analyzed. In an embodiment of the invention, the analysis includes performing edge extraction for the image data, and computing a histogram showing distribution of light and shade of the image from the image data after edge extraction. The edge extraction and histogram computation may be performed using any suitable method. At Step S502, it is then determined whether the computed histogram meets a first criterion. If the computed histogram meets the first criterion, e.g., "YES" at Step S502, then the general image quality of the original image may be determined to be good and the processing is completed. In particular, if the general image quality of the original image is determined to be good, then 0 may be stored in a corresponding cell in the "GENERAL" column 51 in the mark adding table shown in FIG. 3A, and thus the processing is completed.

If the computed histogram does not meet the first criterion, e.g., "NO" at Step S502, then the image data may be corrected at Step S504. In an embodiment of the invention, during the correction process, for example, the image data may be divided into several areas and a histogram may be computed for each of the divided areas. Then, areas not meeting the first criterion may be specified and corrected. The correction may be performed using any suitable method at Step S505.

Then, at Step S506, the corrected image data is analyzed to determine whether the corrected image data meets a second criterion. In an embodiment of the invention, the second criterion may be equal to the first criterion. In another embodiment of the invention, the second criterion may be different from the first criterion. If the corrected image data meets the second criterion, e.g., "YES" at Step S506, then at Step S507, a representation that the general image quality of the original image is good after correction is stored in the mark data memory 23b. In an embodiment of the invention, 1 is stored in a corresponding cell in the "GENERAL" column 51 in the mark adding table shown in FIG. 3A, and the processing is completed.

If the corrected image data does not meet the second criterion, e.g., "NO" at Step S506, then at Step S508, a representation that the general image quality of the original image is poor is stored in the mark data memory 23b. In particular, a 2 is stored in a corresponding cell in the "GENERAL" column 51 in the mark adding table shown in FIG. 3A, and the processing is completed. In this manner, the general image quality of the original image may be evaluated.

Referring again to the flowchart shown in FIG. 4, after the first image quality determining process is completed as described above, processing returns to Step S405. At Step S405, a face detecting process may be carried out. In an embodiment of the invention, the face detecting process comprises detecting whether any human face is included in the original image by, for example, performing edge detection or hue detection for the image data of the original image. The face detecting process may be performed using any suitable method.

Then, at Step S406, it is determined whether or not a human face is included in the original image based on the result of the face detecting process carried out at Step S405. If the processing at Step S405 determines that a human face is included in original image, e.g., "YES" at Step S406, a second image quality determining process may be carried out at Step S407, which is described in more detail herein with reference to a flowchart shown in FIG. 6.

Figure 6:
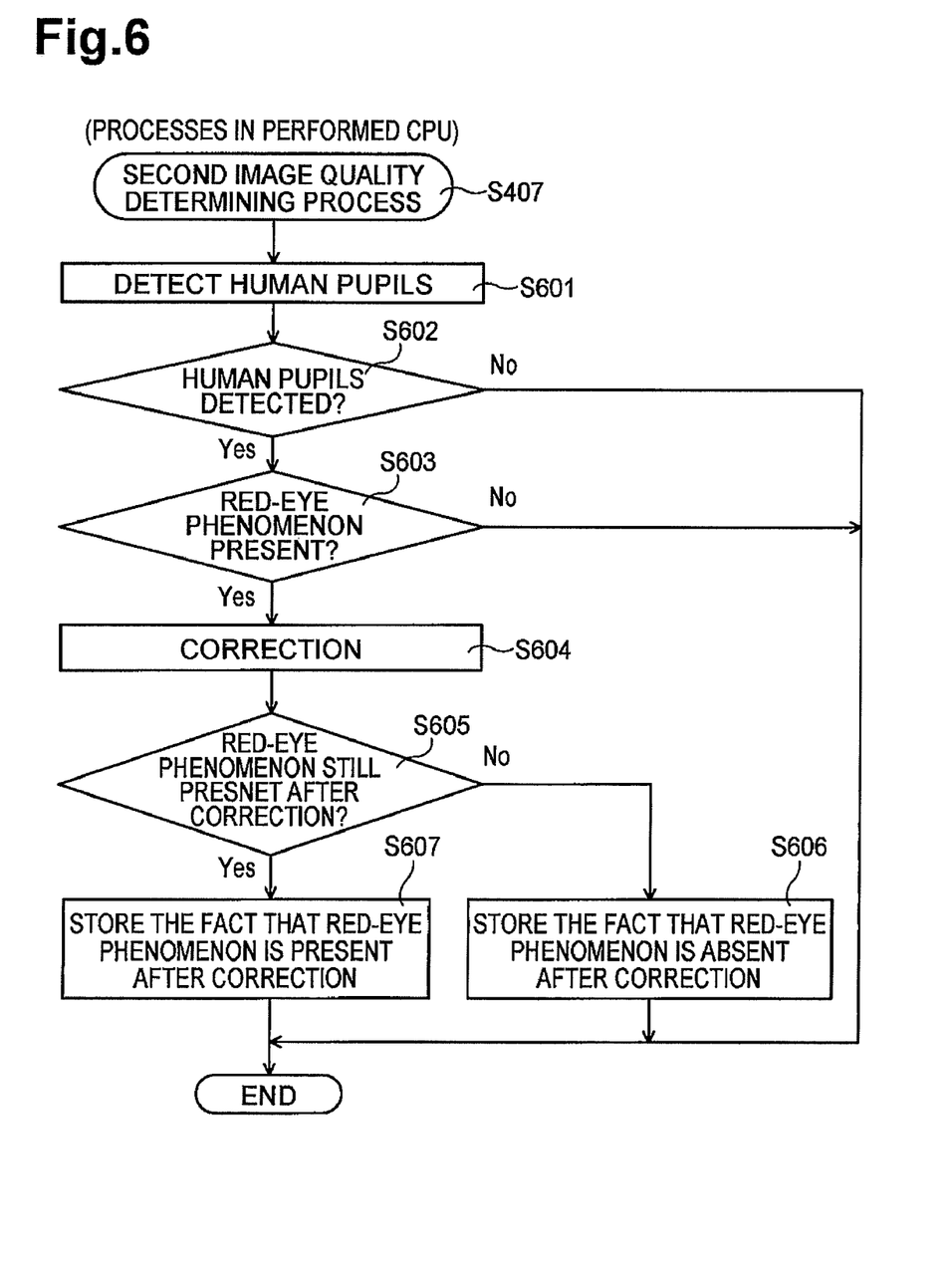
FIG. 6 is a flowchart illustrating a second image quality determining process, according to an embodiment of the invention.

Referring to FIG. 6, according to an embodiment of the invention, the second image quality determining process may determine, by analyzing the image data of the original image, whether or not a red-eye phenomenon is present in human pupils included in the original image. First, at Step S602, detection of pupils is carried out for the human face detected at Step S406 of FIG. 4. If pupils are detected, e.g. "YES" at Step S602, then a color value of a color component of the pupils may be obtained. At Step S603, the obtained color value may be compared with a predetermined first threshold to determine whether a red-eye phenomenon is present in the pupils.

If pupils are not detected, e.g., "NO" at Step S602, or the obtained color value of the pupils is below the predetermined first threshold, e.g., "NO" at Step S603, then it is determined that no red-eye phenomenon is present in the original image, and the processing is completed. In an embodiment of the invention, 0 is stored in a corresponding cell in the "RED EYE" column 52 in the mark adding table shown in FIG. 3A, and the process is completed.

If the obtained color value of the pupils is above the predetermined first threshold, e.g., "YES" at Step S603, a correction process may be carried out at Step S604 for the pupils detected at Step S602. In an embodiment of the invention, color conversion may be performed for the color component of the detected pupils using any suitable method. Then, the corrected color component may be obtained, and again may be compared with a predetermined second threshold at Step S605, to determine whether or not the red-eye phenomenon is still present in the original image after correction. In an embodiment of the invention, the predetermined second threshold may be equal to the predetermined first threshold. In another embodiment of the invention, the predetermined second threshold may be different from the predetermined first threshold.

If the obtained color value of the pupils is below the predetermined second threshold after correction, e.g., "NO" at Step S605, then a representation that the red-eye phenomenon is absent after correction is stored in the mark data memory 23b at Step S606. In an embodiment of the invention, 1 is stored in a corresponding cell in the "RED EYE" column 52 in the mark adding table shown in FIG. 3A, and the processing is completed.

If the obtained color value of the pupils is above the predetermined second threshold after correction, e.g., "YES" at Step S605, then a representation that the red-eye phenomenon is still present is stored in the mark data memory 23b at Step S607. In particular, a 2 is stored in the corresponding cell in the "RED EYE" column 52 in the mark adding table shown in FIG. 3A, and the processing is completed. In this manner, it may be determined whether the red-eye phenomenon is present in the human pupils included in the original image.

Figure 8A:
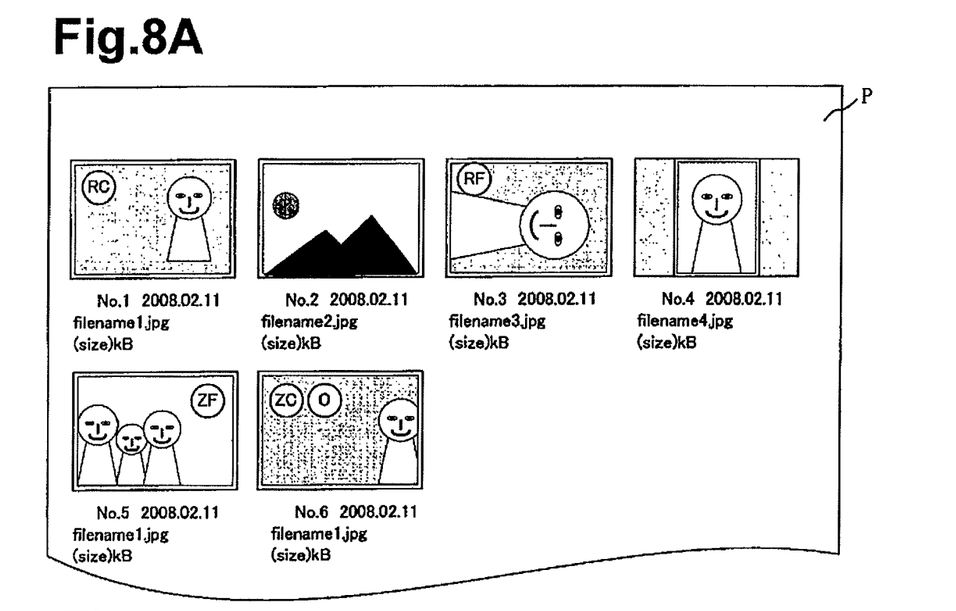
FIG. 8A shows a sheet on which a thumbnail list with marks added inside applicable thumbnails is printed, according to an embodiment of the invention.

Referring again to the flowchart shown in FIG. 4, after the second image quality determining process is completed, it is then determined, by analyzing the image data of the original image, whether a human face is cut off by an image frame. In an embodiment of the invention, as shown in FIG. 8A, the processing determines whether a human face K included in the original image G is cut off by an image frame F. Specifically, in an embodiment of the invention, referring again to FIG. 4, at Step S408, coordinates may be assigned to the human face detected at Step S406, to determine whether a straight line segment T is included in a human face outline at Step S409.

Referring again to FIG. 8A, if the human face K included in the original image G is cut off by the image frame F, as shown in FIG. 8A, a straight line segment T longer than a predetermined length may be included as a part of the face K. The predetermined length of the straight line segment may be set to such a value that it is unlikely or not possible to appear as part of a natural human face. Therefore, in an embodiment of the invention, it may be determined that the face K included in the original image G may be cut off by the image frame F if the straight line segment T is included in the human face outline.

If a straight line segment T is detected in human face K, e.g., "YES" at Step S409, then at Step S410, a representation that the face is cut off by the image frame is stored in the mark data memory 23b. In an embodiment of the invention, 1 is stored in a corresponding cell in the "CUT-OFF" column 53 in the mark adding table shown in FIG. 3A. If a straight line segment T is not detected in human face K, e.g., "NO" at Step S409, then processing may skip Step S410 and may proceed to Step S411. In an embodiment of the invention, because 0 is already stored in the corresponding cell in the "CUT-OFF" column 53 in the mark adding table shown in FIG. 3A, due to the initialization of table values to zero in an embodiment, the routine skips Step S410 and proceeds to Step S411.

Figure 7A:
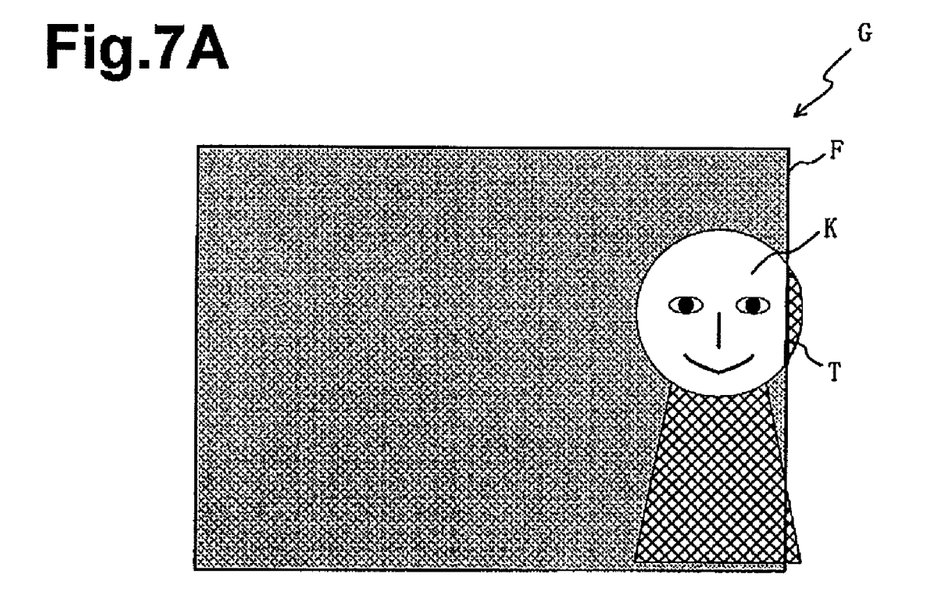
FIG. 7A shows an image in which a human face is cut off by a frame of an image, according to an embodiment of the invention.
Figure 7B:
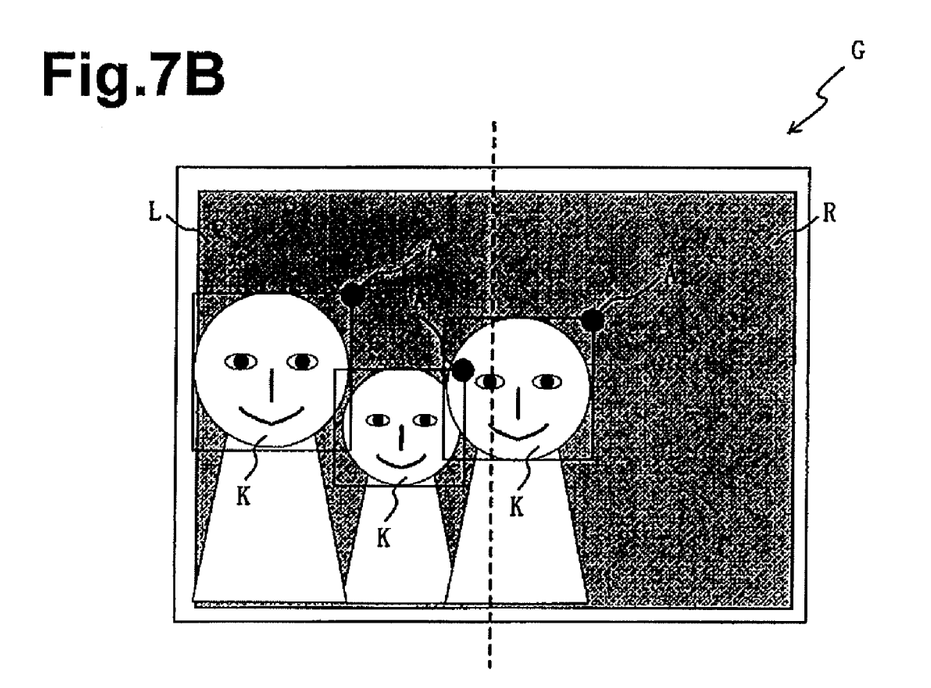
FIG. 7B shows an image in which human faces are located in a left half of an image, according to an embodiment of the invention.

Then, at Step S411, detection of a location of the human face may be carried out. In particular, as shown in FIG. 7B, among the coordinates assigned to the human face at Step S409, a position having the rightmost coordinate and the topmost coordinate may be defined as a reference position A. It is then determined whether the reference position A is located in the left half L or right half R of the original image. If a plurality of human faces are detected in the original image, then in an embodiment of the invention, it is determined in which half a greater number of reference positions A are located.

Then, at Step S412, it is determined whether the face, or faces, is located in the left half L. If the face, or faces, is located in the left half L, e.g., "YES" at Step S412, e.g., as shown in FIG. 7B, the mark position may be set substantially at a top right corner of a corresponding thumbnail at Step S413. In an embodiment of the invention, at Step S413, 1 is stored in a corresponding cell in the "MARK POSITION" column 54 in the mark adding table shown in FIG. 3A.

If the face, or faces, is not located in the left half L, e.g., "NO" at Step S412, the processing skips Step S413 and proceeds to Step S414. In an embodiment of the invention, because 0 is already stored in the corresponding cell in the "MARK POSITION" column 54 in the mark adding table shown in FIG. 3A, due to the initialization of table values to zero in an embodiment, the routine skips Step S413 and proceeds to Step S414.

After Steps S404 through S413 are completed, then at Step S414, mark image data may be integrated, in accordance with the mark adding table shown in FIG. 3A, into the thumbnail image data that corresponds to the target original image. Nevertheless, if a human face is not detected, e.g., "NO" at Step S406, the processing may skip the steps S407-S413 and proceeds to S414.

Then, at Step S415, it is determined whether Steps S404-S414 are completed for all pieces of original image data that are read from the memory card to create the thumbnail image data in S402. If Steps S404-S414 have not been completed for all pieces of original image data, e.g., "NO" at Step S415, then Steps S404-S414 are repeated. If Steps S404-S414 have been completed for all pieces of original image data, e.g., "YES" at Step S415, then thumbnail list image data is created at Step S416. Then, at Step S417, a thumbnail list is printed and the processing is completed.

After the thumbnail list printing process is completed, a sheet P having the thumbnail list printed thereon, as shown in FIG. 8A, may be discharged from the multi-function device 1. A user may use the thumbnail list to evaluate the original images from the thumbnails with marks in the following manner, in accordance with the example previously described according to an embodiment of the invention. The original image of the upper leftmost thumbnail, e.g., No. 1, with the RC mark includes no red-eye phenomenon after correction. The original image of the thumbnail No. 2 with no marks is of good quality. The original image of the thumbnail No. 3 with the RF mark includes a red-eye phenomenon even after correction. The original image of the thumbnail No. 4 with no marks is also of good quality. The original image of the lower leftmost thumbnail, e.g., No. 5, with the ZF mark is of poor quality even after correction because of, e.g., defocus or hand shake. The ZF mark may be given to a top right corner of the thumbnail, e.g., thumbnail No. 5, when human faces are located in the left half of the original image. Accordingly, the ZF mark is added onto the thumbnail at a position not to interfere with the human faces, whereby the user has no difficulty in recognizing the mark and the human faces. Moreover, the original image of the thumbnail No. 6, with ZC and O marks, is of good quality after correction but includes a human face cut off by the image frame.

As described above, marks indicating image quality of original images may be added to a thumbnail list at positions corresponding to applicable thumbnails. Thus, the user easily may recognize whether original images are of good quality in each of a plurality of image quality categories, e.g., general image quality, a red-eye phenomenon, a cut-off of a human face, by checking the marks.

Image quality of an original image may be evaluated in the plurality of image quality categories, and a plurality of marks corresponding to the plurality of image quality categories are selectively added to a thumbnail of the original image. A mark added to the thumbnail indicates that the corresponding original image data does not meet a predetermined criterion of a particular image quality category. Thus, by checking the thumbnail with the mark, the user easily may sort out the original image that does not meet the predetermined criterion of the particular image quality category.

Moreover, as described above, when correction is made to the data of the original image determined not to meet the predetermined criterion of the particular image quality, the mark added to the thumbnail further may indicate that the original image data after correction meets or does not meet another predetermined criterion of the particular image quality category. In this case, by checking the thumbnail with the mark, the user easily may sort out the original image that does not meet another predetermined criterion of the particular image quality category.

Figure 8B:
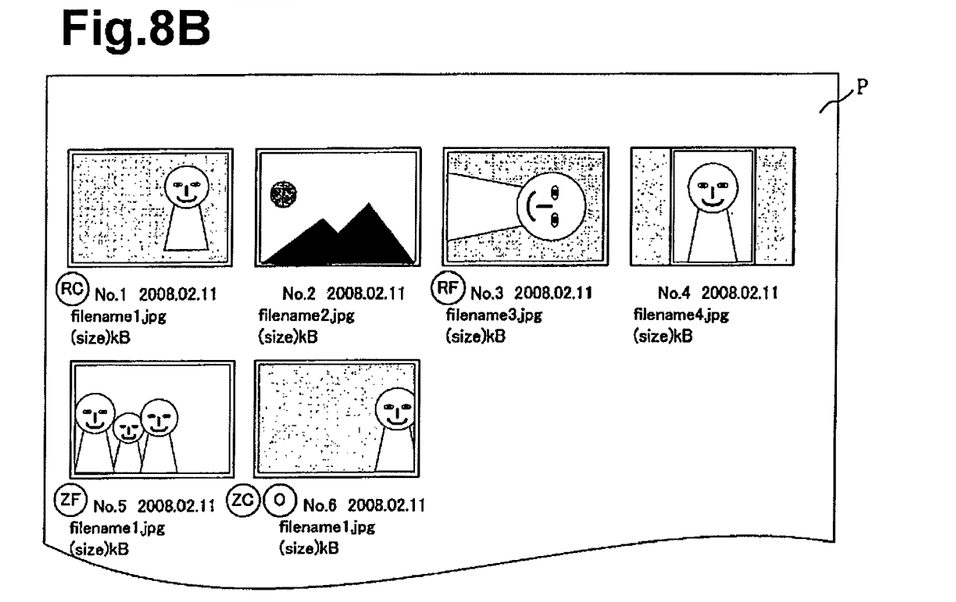
FIG. 8B shows a sheet on which a thumbnail list with marks added outside applicable thumbnails is printed, according to an embodiment of the invention.

In the above-described embodiment, as shown in FIG. 8A, the thumbnail list is output onto the sheet P with marks integrated into the applicable thumbnails. The thumbnail list, however, alternatively may include marks added in index areas outside the applicable thumbnails as shown in FIG. 8B. In this case, in the thumbnail list printing process shown in FIG. 4, Steps S411-S413 for setting a mark position and step S414 may be omitted. In this embodiment, when the thumbnail list image data is created at step S416, the mark image data may be integrated into the thumbnail list image data such that the marks are added outside the applicable thumbnails.

In the above-described embodiment, the thumbnail list image data is output by printing onto the sheet P. However, in another embodiment of the invention, the thumbnail list image data may be output by displaying on the LCD 41 or by transmitting to a networked external device.

In an embodiment of the invention, Steps S402-S417 may be performed by a program executed by the printer CPU. Nevertheless, in other embodiments, these steps may be carried out by a different portion of the printer, or by software, e.g., a computer program product configured to be stored on a computer readable medium, and comprising instructions for causing a processor to execute the above-described steps.

In the above-described embodiment, a plurality of kinds of marks may be added in accordance with the plurality of image quality categories. However, in another embodiment, a single poor mark may be added to a thumbnail of an original image when quality of the original image is poor in one or more image quality categories. In yet another embodiment, the user may select the desired image quality categories such that image quality may be evaluated by only the selected image quality categories, and marks may be added accordingly.

The image quality categories may not limited to those embodiments described above. For example, image quality may be evaluated by determining whether a human in the image is smiling or whether a skin color meets a criterion, and marks may be added accordingly.

Although in an embodiment, the marks may be added at the top left corners or the top right corners of the thumbnails, in another embodiment, an "RF" mark may be added just above the human face with the red-eye phenomenon.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the following claims.

What is claimed is:

1. An image processing device comprising:
   an image quality determining unit configured to determine automatically whether data of an original image meets a particular criterion of a particular image quality category;
   a correcting unit configured to correct automatically the original image data when the image quality determining unit determines that the original image data does not meet the particular criterion of the particular image quality category;
   a corrected image quality determining unit configured to determine automatically whether the corrected original image data meets a further criterion of the particular image quality category;
   a thumbnail list image data generating unit configured to generate image data of a thumbnail list, wherein the image data of the thumbnail list comprises image data of a thumbnail of the original image;
   a mark adding unit configured to add automatically particular indicator mark image data to the thumbnail list image data when the image quality determining unit determines that the original image data does not meet the particular criterion, such that a particular indicator mark is positioned in the thumbnail list at a position corresponding to the thumbnail of the original image, wherein the particular indicator mark indicates a result of the determination made by the image quality determining unit and a result of the determination made by the corrected image quality determining unit; and
   an output unit configured to output the thumbnail list based on the image data of the thumbnail list.

2. The image processing device according to claim 1, wherein when the corrected image quality determining unit determines that the corrected original image data does not meet the further criterion of the particular image quality category, the particular indicator mark further indicates that correction of the original image data has failed.

3. The image processing device according to claim 1, wherein when the corrected image quality determining unit determines that the corrected original image data meets the further criterion of the particular image quality category, the particular indicator mark further indicates that correction of the original image data has been made satisfactorily.

4. The image processing device according to claim 1,
   wherein the image quality determining unit is configured to determine automatically whether the original image data meets a particular criterion of a further image quality category, and
   the mark adding unit is configured to add automatically further indicator mark image data to the thumbnail list image data when the image quality determining unit determines that the original image data does not meet the particular criterion of the further image quality category, such that a further indicator mark is positioned in the thumbnail list at a position corresponding to the thumbnail of the original image, wherein the further indicator mark indicates at least a result of the determination made by the image quality determining unit of whether the original image data meets the particular criterion of the further image quality category.

5. The image processing device according to claim 1, further comprising a face detecting unit configured to analyze the original image data and to detect whether a human face image is present in the original image, wherein the image quality determining unit comprises a cut-off determining unit configured to further analyze the original image data and to determine, when the face detecting unit detects that the human face image is present in the original image, whether the detected human face image is cut off by an image frame, and
   wherein the mark adding unit is configured to add cut-off mark image data, as the particular indicator mark image data, to the thumbnail list image data, such that a cut-off mark is positioned in the thumbnail list at a position corresponding to the thumbnail of the original image, wherein the cut-off mark indicates at least that the human face image in the original image is cut off by the image frame.

6. The image processing device according to claim 5, wherein the cut-off determining unit comprises a straight line determining unit configured to further analyze the original image data and to determine, when the face detecting unit detects that the human face image is present in the original image, whether an outline of the detected human face image includes a straight line segment longer than a predetermined length, and wherein when the straight line determining unit determines that the outline of the detected human face image includes the straight line segment longer than the predetermined length, the cut-off determining unit determines that the human face image is cut off by the image frame.

7. The image processing device according to claim 6, wherein the original image comprises a first half of the original image and a second half of the original image, and the image processing device further comprises a face location detecting unit configured to further analyze the original image data and to determine, when the face detecting unit detects that the human face image is present in the original image, whether the detected human face image is located in the first half or the second half of the original image, and
   wherein the mark adding unit is configured to add the cut-off mark image data to the thumbnail list image data, such that the cut-off mark is positioned in a second half of the thumbnail of the original image when the human face image is located in the first half of the original image, and such that the cut-off mark is positioned in a first half of the thumbnail of the original image when the human face image is located in the second half of the original image.

8. The image processing device according to claim 1, wherein the original image comprises a first half of the original image and a second half of the original image, and the image processing device further comprises:

a face detecting unit configured to analyze the original image data and to detect whether a human face image is present in the original image; and a face location detecting unit configured to further analyze the original image data to determine, when the face detecting unit detects that the human face image is present in the original image, whether the detected human face image is located in the first half or the second half of the original image, and wherein the mark adding unit is configured to add the particular indicator mark image data to the thumbnail image data, such that the particular indicator mark is positioned in a second half of the thumbnail of the original image when the human face image is located in the first half of the original image, and such that the particular indicator mark is positioned in a first half of the thumbnail of the original image when the human face is located in the second half of the original image.

9. The image processing device according to claim 1, wherein the mark adding unit is configured to add the particular indicator mark image data to the thumbnail list image data, such that the particular indicator mark is positioned within the thumbnail of the original image.

10. The image processing device according to claim 1, wherein the mark adding unit is configured to add the particular indicator mark image data to the thumbnail list image data, such that the particular indicator mark is positioned outside the thumbnail of the original image.

11. A non-transitory, computer-readable medium comprising operating instructions configured to instruct a processor to execute the steps of:

determining whether data of an original image meets a particular criterion of a particular image quality category;

correcting the original image data when the original image data does not meet the particular criterion of the particular image quality category;

determining whether the corrected original image data meets a further criterion of the particular image quality category;

generating image data of a thumbnail list, wherein the image data of the thumbnail list comprises image data of a thumbnail of the original image;

adding particular indicator mark image data to the thumbnail list image data when the original image data does not meet the particular criterion, such that a particular indicator mark is positioned in the thumbnail list at a position corresponding to the thumbnail of the original image, wherein the particular indicator mark indicates a result of the determination of whether the original image data meets the particular criterion of the particular image quality category and a result of the determination of whether the corrected original image data meets the further criterion of the particular image quality category; and outputting the thumbnail list based on the image data of the thumbnail list.

12. The non-transitory, computer-readable medium according to claim 11, further comprising operating instructions configured to instruct the processor to execute the steps of:

determining whether the original image data meets a particular criterion of a further image quality category; and adding further indicator mark image data to the thumbnail list image data when the original image data does not meet the particular criterion of the further image quality category, such that a further indicator mark is positioned in the thumbnail list at a position corresponding to the thumbnail of the original image, wherein the further indicator mark indicates at least whether the original image data meets the particular criterion of the further image quality category.

* * * * *